US011615311B2

(12) United States Patent
Li et al.

(10) Patent No.: US 11,615,311 B2
(45) Date of Patent: Mar. 28, 2023

(54) REPRESENTATION LEARNING FOR INPUT CLASSIFICATION VIA TOPIC SPARSE AUTOENCODER AND ENTITY EMBEDDING

(71) Applicant: Baidu USA, LLC, Sunnyvale, CA (US)

(72) Inventors: Dingcheng Li, Sammamish, WA (US); Jingyuan Zhang, San Jose, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 657 days.

(21) Appl. No.: 16/691,554

(22) Filed: Nov. 21, 2019

(65) Prior Publication Data

US 2020/0184339 A1  Jun. 11, 2020

Related U.S. Application Data

(60) Provisional application No. 62/777,551, filed on Dec. 10, 2018.

(51) Int. Cl.
*G06N 3/08* (2006.01)
*G06N 3/04* (2006.01)
(Continued)

(52) U.S. Cl.
CPC ............ *G06N 3/084* (2013.01); *G06F 17/18* (2013.01); *G06K 9/6267* (2013.01); *G06N 3/0454* (2013.01); *G06N 3/0472* (2013.01)

(58) Field of Classification Search
CPC . A61B 5/02433; A61B 5/0059; A61B 5/0261; A61B 6/563; A61B 5/0205;
(Continued)

(56) References Cited

U.S. PATENT DOCUMENTS 10,733,614 B2 *  8/2020  Sapoznik ................ H04L 67/53
2019/0114300 A1 *  4/2019  Miltsakaki ............... G06N 3/08
(Continued)

OTHER PUBLICATIONS

Wei et al. (Locally weighted embedding topic modeling by markov random walk structure approximation and sparse regularization) (Year: 2018).*

(Continued)

*Primary Examiner* — Mohammad K Islam
(74) *Attorney, Agent, or Firm* — North Weber & Baugh LLP

(57) ABSTRACT

Described herein are embodiments of a unified neural network framework to integrate Topic modeling, Word embedding and Entity Embedding (TWEE) for representation learning of inputs. In one or more embodiments, a novel topic sparse autoencoder is introduced to incorporate discriminative topics into the representation learning of the input. Topic distributions of inputs are generated from a global viewpoint and are utilized to enable autoencoder to learn topical representations. A sparsity constraint may be added to ensure that the most discriminative representations are related to topics. In addition, both words and entity related information may be embedded into the network to help learn a more comprehensive input representation. Extensive empirical experiments show that embodiments of the TWEE framework outperform the state-of-the-art methods on different datasets.

20 Claims, 10 Drawing Sheets

(51) Int. Cl.
    *G06K 9/62*     (2022.01)
    *G06F 17/18*     (2006.01)
    *G06N 3/084*     (2023.01)

(58) Field of Classification Search
    CPC ............... A61B 5/024; A61B 5/14551; G06T 2207/10048; G06N 3/084; G06N 3/0454; G06N 3/0472; G06N 3/0445; G06N 3/088; G06F 17/18; G06F 16/35; G06K 9/6267; G06K 9/6262; G06K 9/6273; G06K 9/6234
    See application file for complete search history.

(56) References Cited

U.S. PATENT DOCUMENTS

| | | | | |
|---|---|---|---|---|
| 2019/0114362 | A1* | 4/2019 | Subbian | G06F 16/9535 |
| 2019/0228364 | A1* | 7/2019 | Price | G06N 20/00 |
| 2020/0226651 | A1* | 7/2020 | Rachidi | G06V 10/762 |
| 2020/0265196 | A1* | 8/2020 | Ravi | G06F 40/44 |
| 2021/0004693 | A1* | 1/2021 | Joglekar | G06N 3/084 |

OTHER PUBLICATIONS

Wang et al. (MGAE: Marginalized Graph Autoencoder for Graph Clustering) (Year: 2017).*
Aniguchi et al. (Double Articulation Analyzer with Deep Sparse Autoencoder for Unsupervised Word Discovery from Speech Signals) (Year: 2016).*
Gutmann et al., "Noise-contrastive estimation of unnormalized statistical models, with applications to natural image statistics," Journal of Machine Learning Research, 2012.(55pg).
Mnih et al., "A fast and simple algorithm for training neural probabilistic language models," Proceedings of the 29th International Conference on Machine Learning, 2012. (8pgs).
Shi et al., "Deep LSTM based Feature Mapping for Query Classification," in Proc. of NAACL-HLT, 2016. (11pgs).
Li et al., "Learning Question Classifiers," in Proc. of 19th Intr. Conf. on Computational Linguistics. Association for Computational Linguistics, 2002. (7pgs).
Pennington, "GloVe: Global Vectors for Word Representation," in Proc. of the 2014 Conf. on Empirical Methods in Natural Language Processing, 2014. (12 pgs).
Abadi et al., "Tensorflow: A system for large-scale machine learning," in Symposium on Operating Systems Design and Implementation, vol. 16, 2016. (21pgs).
Silva et al., "From symbolic to sub-symbolic information in question classification," Artificial Intelligence Review, vol. 35, No. 2, pp. 137-154, 2011. (19 pgs).
Ma et al., "Dependency-based convolutional neural networks for sentence embedding," Proc. of the 53rd Annual Meeting of the Association for Computational Linguistics, 2015.(6pgs).
P.Li , "ABC-Boost: Adaptive Base Class Boost for Multi-class Classification," in Proc. of the 26th Annual Intr. Conf. on Machine Learning (ACM), 2009. (8pgs).
Brill et al., "Data-Intensive Question Answering," in Proc. of the 10th Text Retrieval Conf., 2001. (8pgs).
Y. Kim, "Convolutional neural networks for sentence classification," arXiv preprint arXiv:1408.5882, 2014. (6pgs).
Ravuri et al., "A comparative study of neural network models for lexical intent classification," in IEEE, 2015. (8pgs).
Tang et al., "Document modeling with gated recurrent neural network for sentiment classification,".
In Proceedings of the 2015 conference on Empirical Methods in Natural Language Processing, 2015, pp. 1422-1432. (11pgs).
Li et al., "A combination of topic models with max-margin learning for relation detection,".
In Proc. of TextGraphs-6: Graph-based Methods for Natural Language Processing. Association for Computational Linguistics, 2011. (9pgs).
Li et al., "A topic-modeling based framework for drugdrug interaction classification from biomedical text,".
In AMIA Annual Symposium Proceedings, vol. 2016. American Medical Informatics Association, 2016. (11pgs).
Blei et al., "Latent dirichlet allocation," Journal of Machine Learning Research, vol. 3, No. Jan, pp. 993-1022, 2003. (30 pgs).
Mikolov et al., "Distributed representations of words and phrases and their compositionality," arXiv preprint arXiv:1310.4546, 2013. (9pgs).
Bengio et al., "Greedy layerwise training of deep networks," in Advances in Neural Information Processing Systems, 2007. (8pgs).
Vincent et al., "Extracting and composing robust features with denoising autoencoders," in Proc. of 25th intr. conf. on Machine learning. ACM, 2008. (16pgs).
Goodfellow et al., "Deep learning," MIT press Cambridge, 2016. (9pgs).
Zhang et al., "Identifying connectivity patterns for brain diseases via multi-sideview guided deep architectures," in SIAM, pp. 36-44, 2016. (9pgs).
Iyyer et al., "Deep unordered composition rivals syntactic methods for text classification,".
In Proc. of the 53rd Annual Meeting of the Association for Computational Linguistics, 2015. (11pgs).
Kalchbrenner et al., "A convolutional neural network for modelling sentences," arXiv preprint arXiv:1404.2188, 2014. (11pgs).
Zhang et al., "NCR: A Scalable Network-Based Approach to Co-Ranking in Question-and-Answer Sites," in Proc. of the 23rd ACM Intr. Con.on Info. & Knowledge Management, 2014.(10p).
Tai et al., "Improved semantic representations from tree-structured long short-term memory networks," arXiv preprint arXiv:1503.00075, 2015. (11pgs).
Huang et al., "Knowledge graph embedding based question answering," in Proc. of the 12th ACM Intr. Conf. on Web Search & Data Mining, 2019. (9pgs).
Yang et al., "Hierarchical attention networks for document classification," Conf. of the North American Chapter of the Association for Computational Linguistics: Human Language Technologies, 2016. (10pgs).
Joulin et al., "Bag of tricks for efficient text classification," arXiv preprint arXiv: 1607.01759, 2016.(5pgs).
Liu et al., "Incorporating domain and sentiment supervision in representation learning for domain adaptation," Proc.of 24th Intr. Joint Conf.on Artificial Intelligence, 2015.(7pg.

* cited by examiner

800

805

REPRESENTATION LEARNING FOR INPUT CLASSIFICATION VIA TOPIC SPARSE AUTOENCODER AND ENTITY EMBEDDING

CROSS-REFERENCE TO RELATED APPLICATION

This application claims the priority benefit under 35 USC § 119(e) to U.S. Prov. Pat. App. Ser. No. 62/777,551, filed on 10 Dec. 2018, entitled "Representation Learning for Question Classification via Topic Sparse Autoencoder and Entity Embedding", and listing Dingcheng Li, Jingyuan Zhang, and Ping Li as inventors. The aforementioned patent document is incorporated by reference herein in its entirety.

BACKGROUND

A. Technical Field

The present disclosure relates generally to systems and methods for text classification. More particularly, the present disclosure relates to systems and methods for text classification using both topic and entity related embedding.

B. Background

Question answering (QA) is a basic activity of daily human communications. Over the past years, online question answering websites have become increasingly popular for sharing knowledge on a wide range of subjects. People can ask questions in diverse categories through these platforms. Due to the large volumes of questions arriving every second, the first and key step is to effectively understand questions. A better question understanding will help build a more efficient online communication systems. The problem of question understanding and classification has received considerable attention in the last few years.

Conventional approaches focus on representation learning for question classification. One inherent challenge for learning question representations is that questions are typically short texts. Existing approaches often may not effectively extract discriminative representations of questions from a limited number of words.

Accordingly, what is needed are systems and methods for text classification to improve the representation learning of questions.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 depicts a scenario of question understanding and classification using conventional approaches.

DETAILED DESCRIPTION OF EMBODIMENTS

Figure 1:
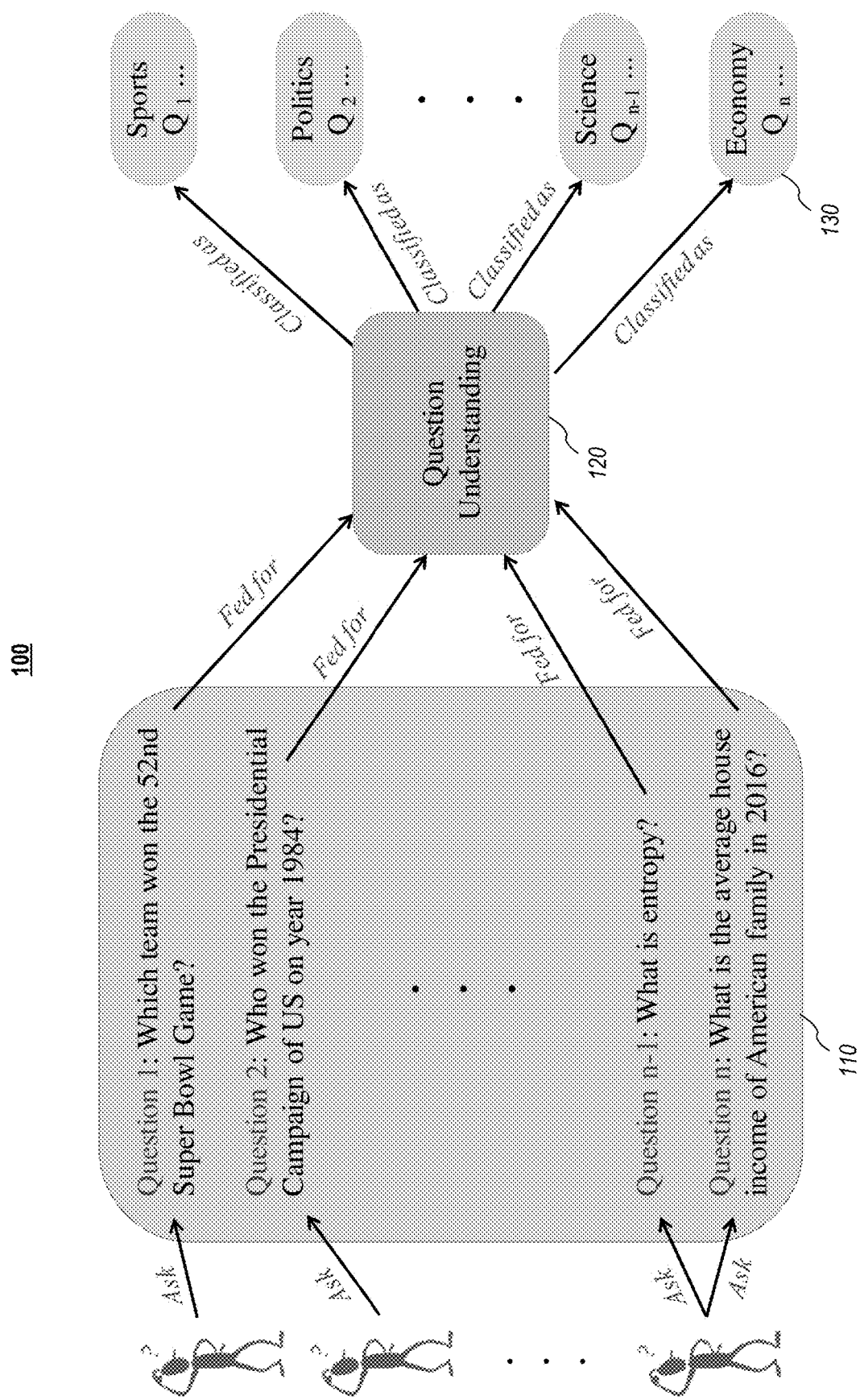

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. A "layer" may comprise one or more operations. The words "optimal," "optimize," "optimization," and the like refer to an improvement of an outcome or a process and do not require that the specified outcome or process has achieved an "optimal" or peak state.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Question answering (QA) is the basic activity of daily human communications. Over the past years, online question answering websites have become increasingly popular for sharing knowledge on a wide range of subjects. People can ask questions in diverse categories through these platforms. Due to the large volumes of questions arriving every second, the first and key step is to effectively understand questions. A better question understanding will help build a more efficient online communication systems. The problem of question understanding and classification has received considerable attention in the last few years.

Some conventional approaches focus on representation learning for question classification as shown in FIG. 1. The left plate 110 in FIG. 1 shows a series of questions asked by users. The middle small plate 120 is procedure of question processing, which is called question understanding. On the right, diverse questions are classified into predefined categories 130. Bag-of-words representation models simply construct language models with words or tokens, including the deep average network, word autoencoders, etc. These methods ignore word orders during the learning process. Sequence representation models, such as Dynamic convolutional neural networks (dynamic CNN) and recurrent neural networks of long short-term memory (LSTM) are proposed to take word orders into consideration. Later, structured representation models are proposed to learn question representations. For example, a tree-structured LSTM generalizes LSTMs to tree-structured network topologies. It captures both word orders and internal structures of questions. Furthermore, attention-based representation models use the attention mechanism to build representations by scoring words and sentences differently.

For learning question representations, one inherent challenge is that questions are typically short texts. The existing approaches often cannot effectively extract discriminative representations of questions from a limited number of words. It is therefore motivated to exploit both entity and topic modeling to improve the representation learning of questions. It is known that topic modeling may capture meaningful semantic structures from the question corpus.

In this patent document, embodiments of a unified neural network framework are presented by integrating Topic modeling, Word embedding and Entity Embedding (TWEE) for question representation learning. In particular, embodiments of a Topic Sparse AutoEncoder (TSAE) integrated with a probabilistic topic modeling algorithm are introduced. Topic distributions of questions are generated from a global viewpoint and are utilized to enable autoencoder to learn topical representations. In one or more embodiments, a sparsity constraint is added to ensure the most discriminative representations are related to question topics. In addition, both words and entity related information are embedded into the network from different local viewpoints. Together with topic modeling, word embedding and entity embedding, embodiments of the proposed TWEE model not only explore information from local contexts of words and entities, but also incorporate global topical structures for a more comprehensive representation learning.

In a short summary, some contributions of the present document include:

Embodiments of a unified neural network TWEE for question representation learning by embedding topics, words and entity-related information together are disclosed.

Embodiments of a novel topic sparse autoencoder (TSAE) to incorporate topic information into a sparse autoencoder for the representation learning process are designed and disclosed.

Embodiments of an interactive mechanism between TSAE, word embedding and entity embedding to coordinate global topics and local contexts of questions are presented.

The effectiveness of a TWEE model embodiment was demonstrated by comparing it with several state-of-the-art methods on question classification.

In the following sections, some related work is discussed in Section B, notations and problem definitions are presented in Section C, embodiments of methodology are disclosed in Section D, experiments to evaluate TWEE framework embodiments are disclosed in Section E, some conclusions are described in Section F, and some system embodiments are described in Section G.

B. Some Related Work

Some related works in various aspects are summarized in this Section. The main theme of the present patent document is to improve input text, such as questions or statements, classification with representation learning. Therefore, relevant works involve the following two aspects: (1) representation learning; and (2) question classification.

1. Representation Learning

Representation learning has been intensively studied and plays an important role for diverse machine learning tasks, classification in particular. The success of deep learning, to a large degree, lies in its embedded capacity of doing representation learning. Word embedding, for example, resolved the issues that deep learning is a framework suitable for continuous data, like image processing while natural language processing (NLP) is internally a task of handling discrete data. However, representation learning of words may be further improved if the combinations of global context and local context may be ushered in. Word embedding based on skip gram or continuous bag of words is local context focused learning while topic modeling or autoencoder aims at global context learning. There is no existing work which incorporates global topics and local context for representation learning in question classification.

Topic Modeling:

As illustrated in Subsection D.1, a fourth term of $\mathcal{L}_{TSAE}$ (W,b) in TSAE aims at adding topic sparsity to autoencoder. In theory, topic sparsity may be derived from diverse clustering results. However, the selection of clustering methods plays an important role in guaranteeing the model robustness. Latent dirichlet allocation (LDA), a representative of topic modeling, is a powerful unsupervised tool to reveal the latent semantic structure from a text corpus based on its global document-word context information. As a soft-clustering model, LDA does not seek a hard clustering on the documents and the words. Instead, it only assigns topic distributions to them. In the process of back-propagation, LDA generates more suitable clustering constraints to SAE.

2. Question Classification

The traditional methods for question classification basically make use of linear classifiers and preprocessed feature vectors to construct classification models. The more recent algorithms construct neural networks, with lower layers focusing on feature extractions and representation learning to question classification and a final layer for classification.

Traditional Question Classification.

Traditional methods to question classification, like any other traditional machine learning tasks, heavily depend on feature engineering and hand-coded rules before adopting some machine learning models, such as logistic regression or support vector machines or boosted trees. Even though such approaches can construct highly accurate classifiers, they are not robust to unseen datasets. In order to extract discriminative features, those approaches make full use of external resources, including domain ontologies and relevant knowledge graphs. For example, WordNet, the lexical database for English, has been used for synset extractions in the question classification for one or more datasets.

Deep Learning Based Question Classification:

The first success in deep learning based question classification came from the work of feeding pre-trained word vectors into a CNN model. As it is known, CNN-based question classification uses linear feature mapping in its convolution operation. Group sparse CNNs have been proposed for question classification by making use of information from answer set. CNNs are good at capturing local invariant regularities, but it has the limitation of ignoring word sequence information. On the contrary, recurrent neural network (RNN) represents word sequence with their ordering information. Therefore, quite a few RNN-based works fill this gap. Due to the superior ability to memorize long distance dependencies, LSTMs have been applied to extract the sentence-level continuous representation. The combination of CNNs and LSTMs achieves good performances.

C. Notations and Problem Definitions

In this section, notations used in the present patent document are presented. Bold uppercase letters such as Z, are used to represent matrices; bold lowercase letters, such as h, are used to represent vectors or embeddings; regular upper case letters, such as H, are used to represent scalar constants; and regular lowercase letters, such as $z_{t,h}^i$, are used to represent scalar variables. Table 1 lists notations which are used throughout present patent document.

Given a question or an input of other types, its bag-of-word representation is denoted as $x \in \mathcal{R}^V$, where V is the number of words in the question set. $D_t$, $D_e$, and $D_w$ are denoted to be the dimensions for topic, entity and word related embeddings, respectively. It is assumed the total number of topics is K and each question focuses on only a small amount of topics. Given M questions, a classic topic model, such as LDA, may help extract topic distributions $T_w \in \mathcal{R}^{V \times K}$ over words and $T_q \in \mathcal{R}^{M \times K}$ over questions. Embodiments of the disclosed TSAE incorporate the topic information $T_w$ into a sparse autoencoder and learn a topic-related embedding a E Jet. In addition, given N entities extracted from the questions, the skip-gram model may be applied, in one or more embodiments, to learn an entity-related embedding $e_e \in \mathcal{R}^{D_e}$. Entity types (e.g., location, person or media) may be used for embeddings since they are more relevant and important to the process of question understandings. Similarly, a word embedding $e_w \in \mathcal{R}^{D_w}$ may be learned via the skip-gram model. With the representations a, $e_e$ and $e_w$, embodiments of the disclosed TWEE framework coordinate global topics and local contexts of a question to learn its representation for question classifications.

TABLE 1

List of Notations

| Notation | Definition and description |
|---|---|
| V, N, M and K | Numbers of words, entities, questions and topics |
| $D_t$, $D_e$ and $D_w$ | Dimensions for topic, entity and word related embeddings |
| $x \in \mathcal{R}^V$ and $a \in \mathcal{R}^{D_t}$ | Bag-of-word for a question and vector for the topic related embedding |
| $u_e \in \mathcal{R}^K$ and $e_e \in \mathcal{R}^{D_e}$ | One-hot vector for an entity e and vector for the entity embedding |
| $v_w \in \mathcal{R}^V$ and $e_w \in \mathcal{R}^{D_w}$ | One-hot vector for a word w and vector for the word embedding |
| $T_w \in \mathcal{R}^{V \times K}$ and $T_q \in \mathcal{R}^{M \times K}$ | Topic distributions over words and questions |
| $h \in \mathcal{R}^{D_t \times K}$ | Topic distribution for the topic related embedding |
| $W \in \mathcal{R}^{D_t \times V}$ | Weight matrix for Topic Sparse Autoencoder (TSAE) |
| $b \in \mathcal{R}^{D_t}$ and $c \in \mathcal{R}^{D_t}$ | Bias vectors for encoder and decoder in TSAE |
| γ | Regularization parameter for TSAE to prevent over-fitting |
| ρ and θ | Sparsity parameter and the topic sparsity parameter in TSAE |
| α and β | Weights of the sparsity term and the topic guidance term in TSAE |
| $\hat{x} \in \mathcal{R}^V$ | Decoded representation for a question in TSAE |
| $\hat{\rho}i$ | Average activation of the j-th topic related embedding |
| $\hat{\theta}_k$ | Average activation of topic related embedding for the k-th topic |

Figure 2:
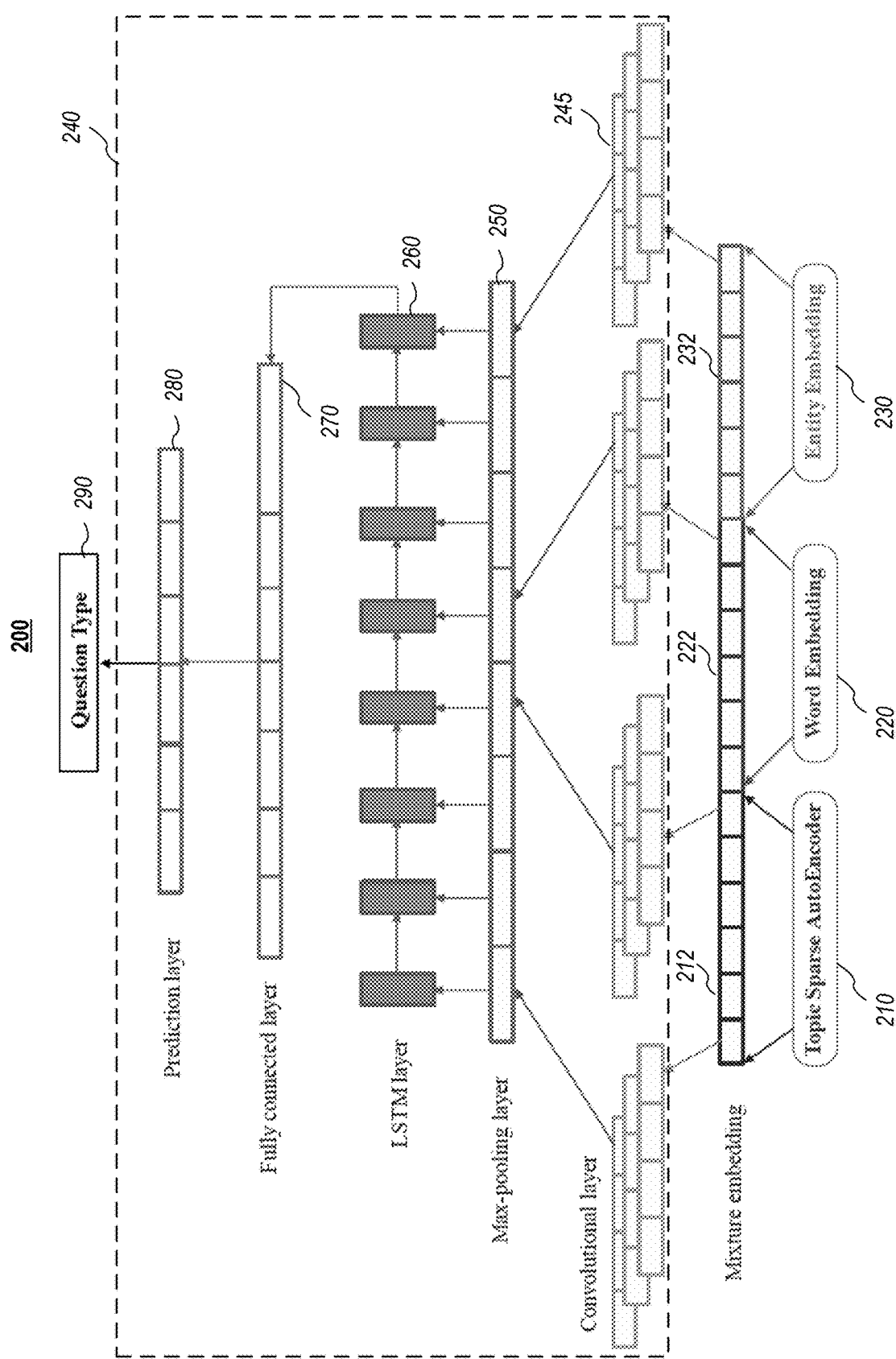
FIG. 2 graphically depicts an exemplary network structure of Topic modeling, Word embedding and Entity Embedding (TWEE) framework, according to embodiments of the present disclosure.

FIG. 2 illustrates a full architecture of a TWEE framework, according to embodiments of the present disclosure. The TWEE framework 200 is constructed incorporating three input components, namely, the topic sparse autoencoder 210, a word embedding 220 and an entity embedding 230. In one or more embodiments, the topic embedding 212, word embedding 222 and entity embeddings 232 are concatenated into a mixture embedding, which is fed into a classifier 240 for question type classification. In one or more embodiments, the classifier 240 may comprise a convolutional layer 245 with multiple filters to detect features at different positions, a max-pooling layer 250, an LSTM layer 260, a fully connected layer 270, and a prediction layer 280 to output a final question type 290. Details of the input classification using the TWEE framework 200 may also be found in section D.4.

Although figures and one or more embodiments described herein use question as an embodiment of an input, one skilled in the art shall understand the input may not be limited as question. Instead, it may be referred as other types of input, such as a statement, an expression, etc. Accordingly, the classification output may also other types of input classification, such as expression type, etc., besides question type.

Figure 3:
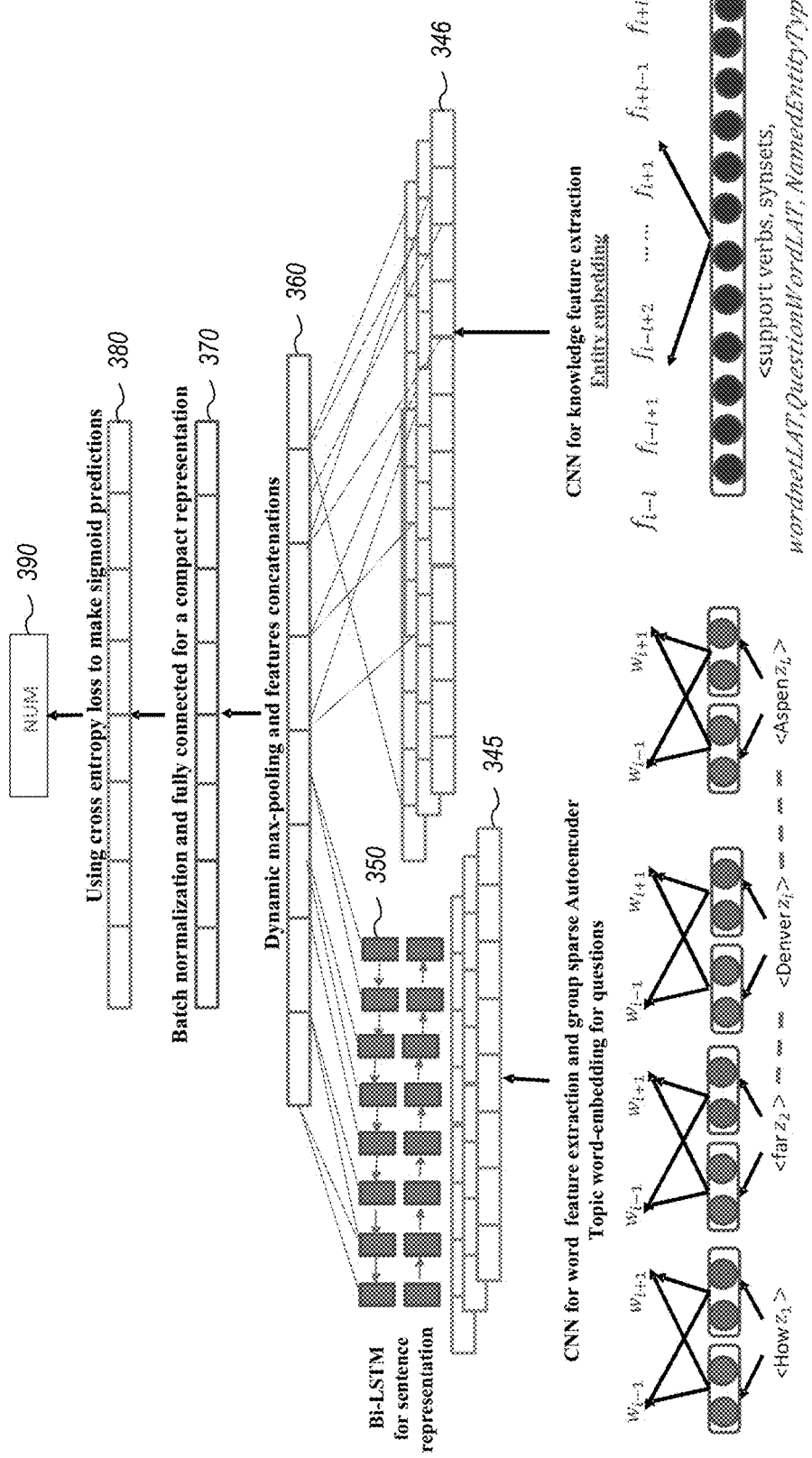
FIG. 3 graphically depicts a network structure of an alternative TWEE framework, according to embodiments of the present disclosure.

FIG. 3 illustrates an alternative architecture of a TWEE framework, according to embodiments of the present disclosure. Different from the TWEE framework shown in FIG. 2, in the TWEE framework 300, the topic embedding and word embedding are concatenated and then fed into a first convolutional neural network (CNN) 345 for word and topic feature extraction. In one or more embodiments, a bidirectional LSTM (Bi-LSTM) 350 is employed for sequential processing the extracted features to obtain a sentence representation. In parallel, a second CNN 346 is used for knowledge feature extraction from one or more entity embeddings, which may be based on support verbs, synsets, wordnet lexical answer type (wordnetLAT), questionword lexical answer type (questionwordLAT), named entity type, etc. A dynamic max-pooling and concatenation layer 360 is applied on the sentence representation and knowledge features to select and concatenate the most important features. In one or more embodiments, the selected most important features are fed into a fully connected layer 370, in which the features also undergo batch normalization, to obtain a compact representation. Cross entropy loss may be used to calculate in a prediction layer 380 to make sigmoid predictions for the input (e.g., question) classifications. Based on the predictions, an input (e.g., question) type 390 is given.

D. Embodiments of Methodology

This section presents details of TWEE framework embodiments, which integrate topic modeling, word embedding and entity embedding for question representation learning. Firstly, a topic sparse autoencoder (TSAE) incorporates a probabilistic topic modeling algorithm into a sparse autoencoder. The global topical representations of questions are learned. Then, how word embeddings are learned from questions to capture the local context information is presented. Furthermore, this section explains embodiments of how to get entity embeddings to improve the representation learning of questions. Finally, this section shows how embodiments of the TWEE framework are built for a more comprehensive representation learning of questions.

1. Embodiments of Topic Sparse Autoencoder (TSAE)

In order to learn topic-related representations of questions, aspects of a classic sparse autoencoder (SAE) using self-reconstruction criterion may be adopted in one or more embodiments. Autoencoder is an unsupervised feedforward neural network that applies backpropagation by fitting the input using the reconstructed output. It is often used to reduce high-dimensional features and pre-train deep learning models. Basically, SAE encodes the i-th input question $x_i$ to a hidden representation $a_1 \in \mathcal{R}^{D_t}$ by a feedforward propagation $$a_i = f(Wx_i + b) \quad (1)$$

Here $a_i$ is the topic related embeddings for the i-th question. $W \in \mathcal{R}^{D_t \times V}$ is a weight matrix and $b \in \mathcal{R}^{D_t}$ is a hidden bias vector. $f(\cdot)$ is the activation function (e.g., the sigmoid function $$f(x) = \frac{1}{1 + \exp(x)}$$

or ReLU). After the feedforward pass, $a_i$ is decoded to a representation $$\hat{x}_i = f(W^T a_i + c) \quad (2)$$

$c \in \mathcal{R}^{D_t}$ is a bias vector for the decoder. In one or more embodiments, a sparsity constraint is imposed on the hidden representation of $a_i$ to reduce noise in SAE. The overall cost function of SAE may be defined as:

$$\mathcal{L}_{SAE}(W, b) = \frac{1}{M}\sum_{i=1}^{M} \frac{1}{2}\|\hat{x}_i - x_i\|^2 + \frac{\gamma}{2}\|w\|^2 + \alpha \sum_{j=1}^{D_t} KL(\rho\|\hat{\rho}_j) \quad (3)$$

where the first term is the average of reconstruction loss on all questions with sum-of-squares. The second term is a regularization term to prevent over-fitting, where $\gamma$ is the regularization parameter. It aims to control the sparsity of the weight and bias parameters W and b. The third term is the Kullback-Leibler (KL) divergence between two Bernoulli random variables with mean $\rho$ and $\hat{\rho}_j$, respectively:

$$KL(\rho\|\hat{\rho}_j) = \rho \log\frac{\rho}{\hat{\rho}_j} + (1-\rho)\log\frac{1-\rho}{1-\hat{\rho}_j} \quad (4)$$

The third term is used for penalizing $\hat{\rho}_j$ deviating significantly from the word sparsity parameter $\rho$. $\alpha$ is the weight of the sparsity term in the overall cost function.

In one or more embodiments, $$\hat{\rho}_j = \frac{1}{M}\sum_{i=1}^{M} a_{ij}$$

is the average activation of the j-th hidden representation. $a_{ij} \in a_i$ is the j-th hidden unit for the i-th question.

Figure 4:
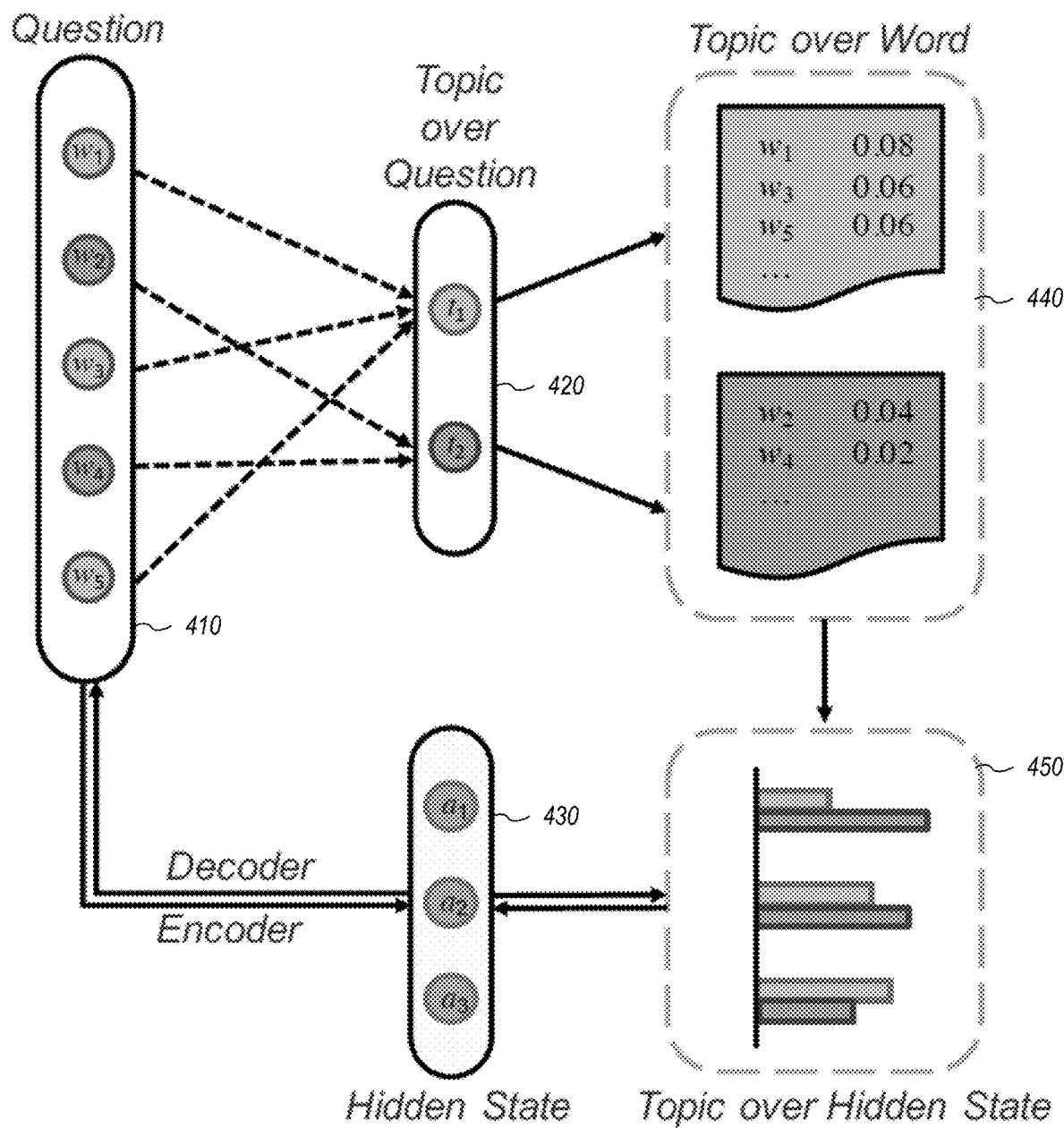
FIG. 4 graphically depicts a structure of a topic sparse autoencoder (TSAE), according to embodiments of the present disclosure.

As questions are typically short texts, directly applying SAE to short questions often cannot effectively extract discriminative representations from a limited number of words. Thus, the topical information hidden in questions may be taken advantage to improve the representation learning of questions as shown in FIG. 4. As shown in FIG. 4, the encoder is enhanced with topics learned from topic modeling, which comprises generating topic distributions over question 420 given an input (e.g., a question) 410, and a topic distribution for words 440 based on the topic distributions over question 420. The topic distributions for words 440 are fed into hidden states 430 to form a topic over hidden state 450 so that the representation learning is more discriminative. In one or more embodiments, an aim is to encapsulate topical information into the overall cost function of SAE so that the learned hidden representations also reflect the topic distributions of questions. In order to achieve this goal, in one or more embodiments, a fourth term is added as a topic guidance term and a goal of the TSAE (topic sparse autoencoder) is to minimize the following objective function:

$$\mathcal{L}_{TSAE}(W, b) = \quad (4)$$

$$\frac{1}{M}\sum_{i=1}^{M}\frac{1}{2}\|\tilde{x}_i - x_i\|^2 + \frac{\gamma}{2}\|w\|^2 + \alpha\sum_{j=1}^{D_t} KL(\rho\|\hat{\rho}_j) + \beta\sum_{k=1}^{K} KL(\theta\|\hat{\theta}_k)$$

where $\theta$ is the topic sparsity parameter for the hidden representations and $\beta$ is the weight of the topic guidance term in the overall objective function. $\hat{\theta}_k$ is the average activation of the hidden layer for the k-th topic:

$$\hat{\theta}_k = \frac{1}{MD_t}\sum_{i=1}^{M}\sum_{j=1}^{D_t}\|h_{jk}^i\|^2 \quad (5)$$

where $h_{jk}^i \in h_i \in \mathcal{R}^{D_t \times K}$ is the topic distribution of the j-th hidden state over the k-th topic for the i-th question.

$h_i = a_i x_i^T T_w$ is the topic distribution for the hidden representation $a_i$.

The topic guidance term is designed for hidden representations learning of a. It reflects the global topical information of questions. The KL divergence $KL(\theta\|\hat{\theta}_k)$ helps reconstruct the input with the activation that is related to the most discriminative topics.

Figure 5:
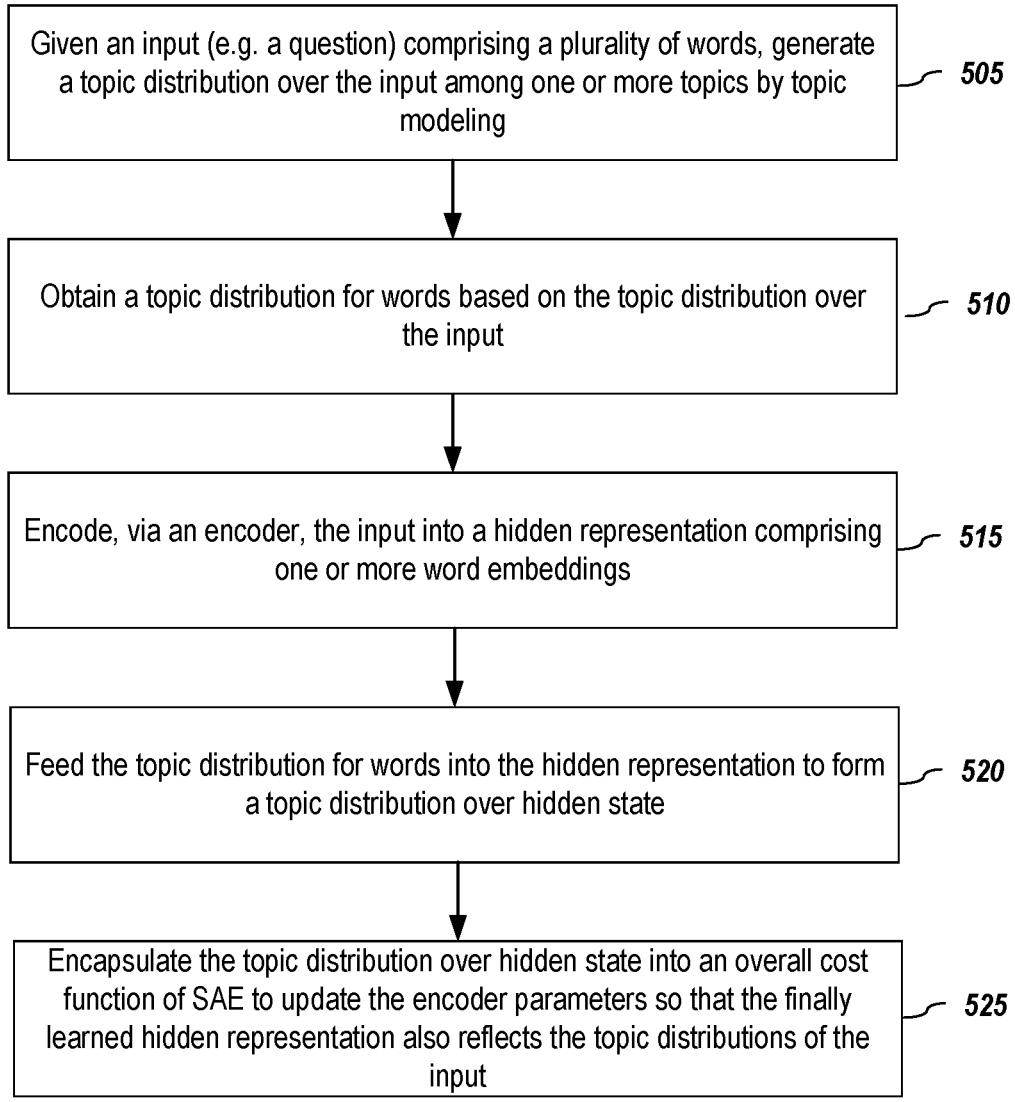
FIG. 5 depicts a process for topic-related representation learning using the TSAE, according to embodiments of the present disclosure.

FIG. 5 depicts a process for topic-related representation learning using the TSAE, according to embodiments of the present disclosure. In step 505, given an input (e.g. a question) comprising a plurality of words, a topic distribution over the input among one or more topics is generated by topic modeling. In one or more embodiments, the topic modeling in the TSAE comprises pre-trained probabilistic topic modeling algorithm. In one or mode embodiments, each topic is associated to one or more words from the input. In step 510, a topic distribution for words is obtained based on the topic distribution over the input (e.g. question). In step 515, the input is encoded, via an encoder, into a hidden representation, which may comprise one or more word embeddings. In step 520, the topic distribution for words is fed into the hidden representation to form a topic distribution over hidden state (or a topic distribution over the one or more word embeddings in the hidden state) so that the representation learning is more discriminative. In step 525, the topic distribution over hidden state may be encapsulated into an overall cost function of SAE to update the encoder parameters so that the finally learned hidden representations also reflect the topic distributions of the input (e.g. question). In order to achieve this goal, in one or more embodiments, a fourth term is added as a topic guidance term (based on a sum of KL divergences between a topic sparsity parameter $\theta$ for the hidden representations and an average activation $\hat{\theta}_k$ of the hidden layer for each topic) in the overall loss function.

2. Embodiments of Word Embedding

Figure 6:
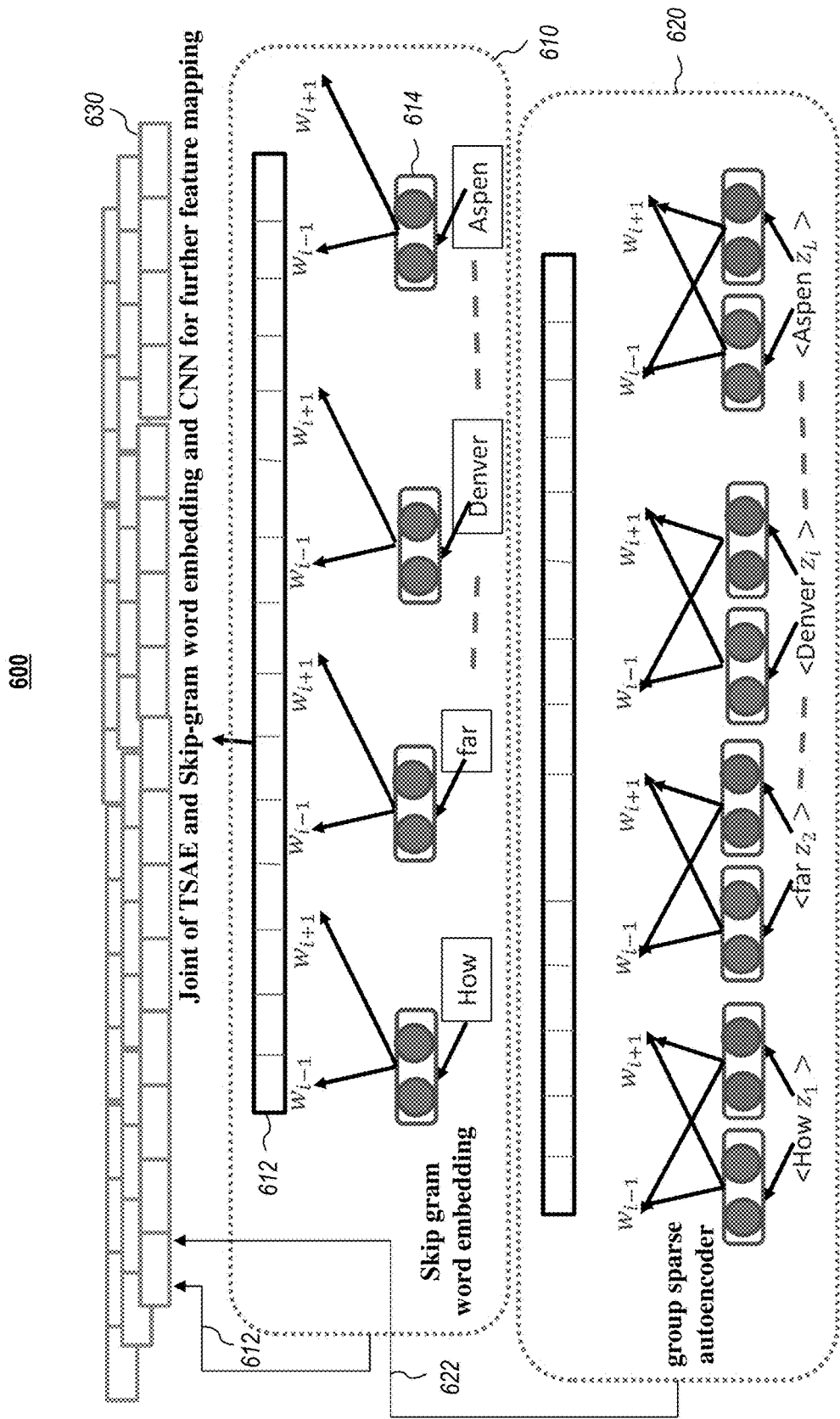
FIG. 6 graphically depicts a network structure for word embedding learning, according to embodiments of the present disclosure.

The embedding a learned from the above TSAE module reflects global topical information of questions while the word embedding considers local context information. In one or more embodiments of the present invention, skip-gram method is applied to learn word embeddings $e_w$, considering that since an exemplary corpus is composed of short texts and in medical field, there may be quite a few number of rare words or phrases. A training objective of the skip-gram model is to learn word representations that are helpful for predicting the nearby words. Given a sequence of training words $S_w = \{w_1, w_2, \ldots, w_s\}$ extracted from questions, the formal objective of the skip-gram model is to maximize the average log probability $$\mathcal{L}_{word} = \frac{1}{|S_w|}\sum_{w_i \in S_w}\sum_{w_j \in C(w_i)}\log p(w_j | w_i) \quad (6)$$

where $w_i$ is a target word and $C(w_i)$ represents the context words of $w_i$. $C(w_i)$ is generated by collecting a window of words to the left and to the right of the target word $w_i$. In one or more embodiments, c is used to denote the window size. The conditional probability $P(w_j|w_i)$ may be defined as:

$$p(w_j | w_i) = \frac{\exp(e_{w_j}^T v_{w_i})}{\sum_{k=1}^{V}\exp(e_{w_k}^T v_{w_i})} \quad (7)$$

where $v_w$ is the input one-hot vector representation of word w and $e_w$ is the corresponding embedding vector representation. V is the number of words in the question vocabulary. Since the cost of computing the derivative of log $p(w_j|w_i)$ is proportional to V, the stochastic gradient descent with negative sampling is deployed to the skip-gram model. FIG. 6 illustrates a learning process for word embeddings, according to one or more embodiment of the present disclosure. In FIG. 6, a group sparse autoencoder 620 and a skip-gram network 610 are used jointly to extract features from the input. For the skip-gram network 610, given an input (e.g., a question), a one-hot representations 614 of words in the input is transformed into low-dimensional word embeddings 612. In one or more embodiments, the prediction from each one-hot representation is context words of the word corresponding to the one-hot representation. The word embeddings 612 and the topic embeddings 622 generated by the group sparse autoencoder 610 are fed together into a CNN 630 for further feature mapping. Considering that the TSAE is a different representation involving topics and a count-based auto-encoder while the skip-gram embedding and CNN make use of contextual information, the TSAE and the combination of skip-gram embedding and CNN may be complementary to each other for improved performance.

3. Embodiments of Entity Embedding

In one or more embodiments, the embeddings a and $e_w$ learn both global topical information and local contexts from questions. They are helpful for question understandings. Moreover, entities in questions may often provide more auxiliary information for short texts from a different local viewpoint. By incorporating entity information into the representation learning process, the understanding of questions may be further improved.

Similar to the word embedding process, skip-gram method may be applied to learn entity embeddings $e_e$. In one or more embodiments, by maximizing an average log probability, entity embeddings may be learned to help predict nearby entities. The formal objective may be formulated as:

$$\mathcal{L}_{entity} = \frac{1}{|S_e|}\sum_{e_i \in S_e}\sum_{e_j \in Q(e_i)}\log p(e_j | e_i) \quad (8)$$

where $S_e = \{e_1, e_2, \ldots, e_s\}$ is a sequence of training entities extracted from questions. $e_i$ is a target entity and $Q(e_i)$ represents the co-occurred entities with $e_i$ in questions. $Q(e_i)$ is generated by collecting a window of entities to the left and to the right of the target entity $e_i$. c is still used to denote the window size. The conditional probability $p(e_j|e_i)$ may be defined in a similar way as:

$$p(e_j \mid e_i) = \frac{\exp(e_{e_j}^T u_{e_i})}{\sum_{k=1}^{N} \exp(e_{e_k}^T u_{e_i})} \quad (9)$$

Where $u_e$ is the input one-hot vector representation of entity e and $e_e$ is the corresponding embedding vector representation. N is the number of entities in the questions. The stochastic gradient descent with negative sampling is deployed to speed up the computational time. In one or more embodiment, the learning process for entity embedding may be quite similar to word embeddings and thus the learning network may be similarly illustrated using the skip-gram network 610 in FIG. 6 as well.

In one or more embodiments, for entity embedding, $e_e$ for the whole question is a concatenation of all entity embeddings in the input, and may have multiple embeddings. In one or more embodiments, an entity phrase of an entity may comprise multiple words, since each entity has its own hidden state representation, and the entity has only one word embedding.

4. Embodiments of Full Architecture of TWEE

Figure 7:
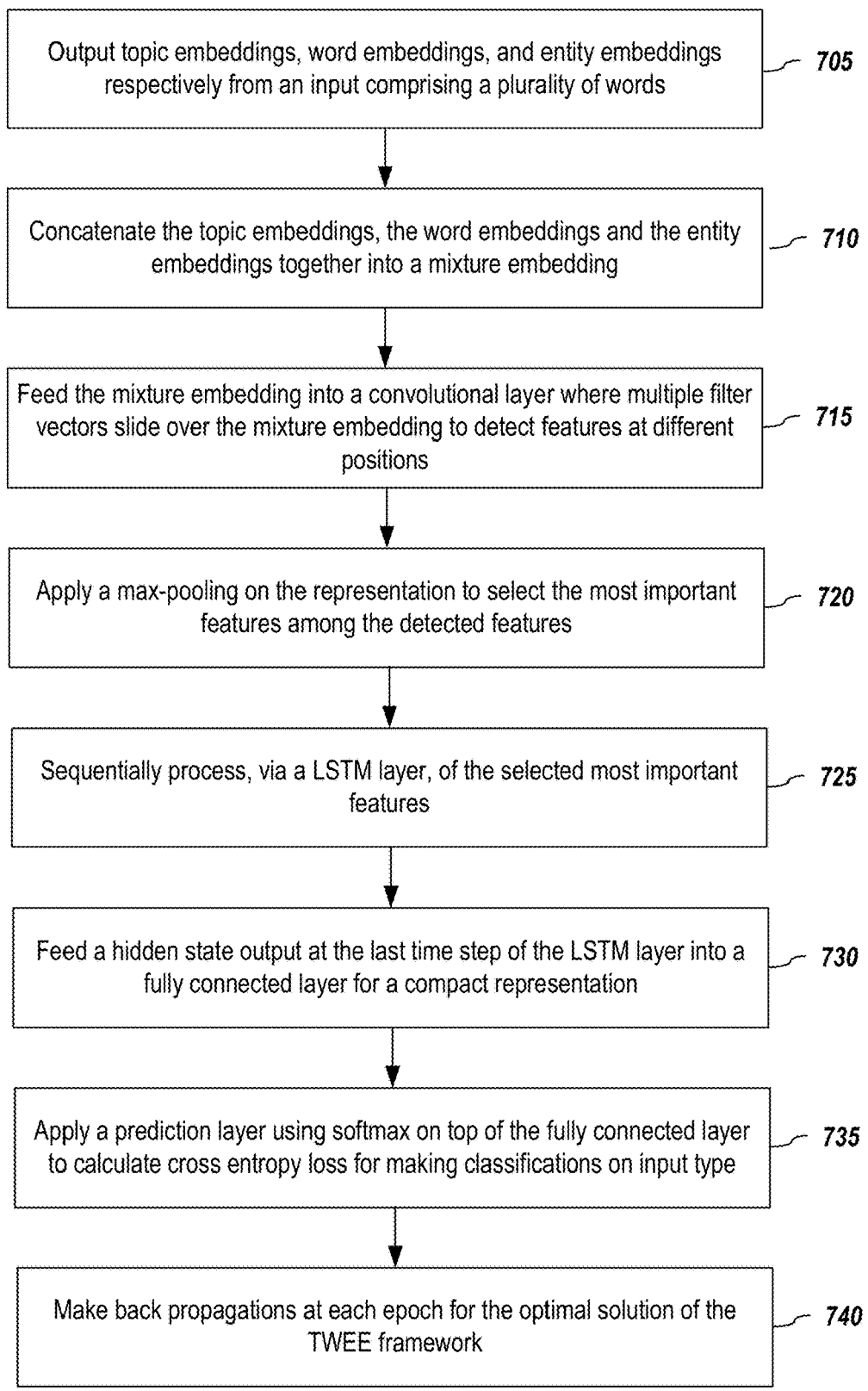
FIG. 7 depicts a process for question classification using the TWEE framework, according to embodiments of the present disclosure.

Together with the topic, word and entity embeddings, embodiments of the disclosed TWEE framework train a neural classifier for the question type classification as shown in FIG. 2. FIG. 7 depicts a process for question classification using the TWEE framework, according to embodiments of the present disclosure. For a given input comprising a plurality of words, topic embeddings, the word embeddings, and the entity embeddings are output (705) from the input. In one or more embodiments, for simplicity, TWEE concatenates (710) the three types of embedding representations (the topic embeddings, the word embeddings and the entity embeddings) together into a mixture embedding and feeds (715) the mixture embedding into a convolutional layer where multiple filter vectors slide over the mixture embedding sequence to detect features at different positions. In one or more embodiments, a ReLU function is employed on the detected feature maps to do the nonlinear transformations. With n filters, TWEE obtains a successive high-order window representation, which concatenates the feature maps of n filters by column. A max-pooling is applied (720) on the representation to select the most important features among the detected features. Then a LSTM layer is employed (725) for sequential processing of the selected most important features. In the LSTM layer, a range of repeated modules for each time step are defined. Namely, at each time step, the output of the module is a function of the old hidden state and the input of the current time step.

In one or more embodiments, the output is controlled by a set of gates at the current time step, including the forget gate, the input gate and the output gate. These gates collectively decide how to update the current memory cell and the current hidden state. After the LSTM layer is processed, the output of the hidden state at the last time step of LSTM is fed (730) into a fully connected layer for a compact representation of the input (e.g. a question). Then a prediction layer using softmax is applied (735) on the top of the fully connected layer. The cross entropy loss is calculated to make classifications on input type(s). In one or more embodiments, back propagations are made (740) at each epoch for the optimal solution of the TWEE framework, until a predetermined condition (e.g. epoch number, or difference between epochs) is reached.

E. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, results of extensive experiments were reported to evaluate embodiments of the presented TWEE framework.

1. Embodiments of Datasets and Experimental Setup

In one or more experimental settings, two datasets are used in the experiment for the question classification. One is a Chinese medical QA dataset on how patients with diabetes or hypertensions manage daily life. The other dataset is an English dataset for factoid question type classification. Experiments show that TWEE perform well in both the Chinese Medical QA dataset and the English dataset. It shall be noted that the medical QA dataset focuses on the specific topic of diseases while the English dataset is more general with diverse topics.

For the medical QA dataset, the aim is to classify the questions into three types, i.e., "yes-no", "selection" and "description". A total of approximately 100,000 questions were collected and their types were labeled by three domain experts with 99% of inter-annotator agreements. In one or more experimental settings, a popular text segmentation tool Jieba is used to tokenize the questions and detect entities. The total number of tokens is 37,875. Since the disease related entities are the most important for the medical QA dataset, the recognized entities were mapped with several medical knowledge resources. In one or more experimental settings, the embeddings of entity-related information are trained with random initialization in skip-gram. The word embeddings are initialized with the 300 dimensional pretrained vector representations learned from a large Chinese medical corpus via the Global Vectors for Word Representation (GloVe) model.

For the English dataset, there are approximately 6,000 questions with approximately 10,000 words. The questions are divided into 6 categories, including "human", "entity", "location", "description", "abbreviation" and "numeric". The supported verbs and lexical answer types are considered as entities for the English dataset. They were extracted from the questions and mapped with WordNet. The embeddings of entity-related information were also trained with skip-gram. The word embeddings are initialized with the 300 dimensional pretrained vectors from the Common Crawl of 840 billion tokens and 2.2 million vocabularies. The statistics of the datasets are summarized in Table 2.

In the experiment, embedding dimensions ranging from 50 to 300 were tested. TWEE achieves the best performance when the embedding size is 50 and 100 for the English dataset and Chinese medical QA datasets, respectively. The number of topics was set as 10 for the English dataset and 7 for the medical QA dataset. The regularization parameter $\gamma$ was set to 0.01 for both datasets. The sparsity parameter $\rho$ and the topic sparsity parameter $\theta$ were both set to 0.05 in the experiment. The weights a for the sparsity term and β for the topic guidance term were both set to 0.1.

TABLE 2

Statistics of the Datasets, where standard division of data was used into training, validation and testing sets. The Chinese medical QA dataset and the English dataset have quite different distributions in words (~38,000 vs ~9,600 words) and entities (20 vs 2400 entity types)

| Dataset | #Classes | #Questions | #Training | #Validation | #Testing | #Words | #Entity Types |
|---|---|---|---|---|---|---|---|
| Chinese medical QA | 3 | 100,024 | 70,130 | 10,045 | 20,039 | 37,875 | 20 |
| English Dataset | 6 | ~6,000 | 5,000 | ~500 | 500 | 9,592 | 2,400 |

2. Some Experimental Results

The results for the medical QA dataset are reported in Table 3. For comparisons, two models (CNN and LSTM based) were run after making little adaptation for question classification to get two groups of results as seen in the first two rows in Table 3. From the fourth row to the end, representation learning for words are obtained with sparse autoencoder (SAE), topic sparse autoencoder (TSAE), integration of TSAE and skip-gram word embedding and finally embodiments of the TWEE with the integration of TSAE, skip-gram WV and entity embedding (EE) respectively (TSAE+WV+EE+CNN-LSTM). In one or more experimental settings, CNN and CNN-LSTM were used to train the classifiers to show how much difference between CNN and CNN-LSTM may bring under the context of TSAE. The results show a few trends: topic sparse autoencoder achieves better results than sparse autoencoder; the integration of TSAE and WV boosts the performance; the proposed TWEE with the integration of TSAE, WV and entity embedding further improves the classification results.

TABLE 3

The performance on the medical QA dataset. The focus was on deep learning methods plus different word vectors aiming at highlighting the effectiveness of embodiments of the present TSAE methods. It is clear to see the incremental trend.

| Model | Acc (%) | Pre (%) | Rec (%) | F1 (%) |
|---|---|---|---|---|
| WV + CNN | 92.0 | 91.5 | 92.2 | 91.8 |
| WV + CNN-LSTM | 94.1 | 93.3 | 92.9 | 93.1 |
| AE + CNN | 51.0 | 49.2 | 47.3 | 48.2 |
| SAE + CNN | 78.2 | 75.5 | 77.6 | 76.5 |
| TSAE + CNN | 84.5 | 83.3 | 84.2 | 83.7 |
| TSAE + CNN-LSTM | 86.0 | 84.5 | 85.4 | 84.9 |
| TSAE + WV + CNN-LSTM | 95.0 | 94.2 | 93.3 | 93.7 |
| TWEE | 96.2 | 95.4 | 96.5 | 95.4 |

The results for the English are listed in Table 4, where embodiments of TWEE were compared to a variety of models. Traditional approaches construct a classifier over a large number of manually engineered features and hand-coded resources. The best classification results with that approach comes from an SVM classifier trained with unigrams, bigrams, wh-word, head word, POS tags and hypernyms, WordNet synsets and 60 hand-coded rules and achieved 95% accuracy. Besides SVM, the classification performance of other baselines related to CNN or LSTM are listed in Table 4. TWEE consistently outperforms all published neural baseline models listed in Table 4. TWEE result is also better than that of the state-of-the-art SVM that depends on highly engineered features. Such engineered features not only demands human laboring but also leads to the error propagation in the existing NLP tools. With the ability of automatically learning semantic sentence representations, embodiments of the disclosed framework do not require any human-designed features and has a better scalability. Without doubt, entity embedding plays an essential role for the final win-out over that of SVM.

TABLE 4

The performance on the English data. Besides highlighting effectiveness of embodiments of the TSAE method, comparisons were made with results, which are available from referenced papers.

| Model | Acc (%) |
|---|---|
| SVM [1] | 95.0 |
| DCNN [2] | 93.0 |
| Group Sparse CNNs [3] | 94.2 |
| D-LSTM [4] | 94.8 |
| WV + CNN | 91.8 |
| WV + CNN-LSTM | 93.6 |
| AE + CNN | 65.5 |
| SAE + CNN | 83.4 |
| TSAE + CNN | 87.5 |
| TSAE + CNN-LSTM | 92.0 |
| TSAE + WV + CNN-LSTM | 94.0 |
| TWEE | 96.5 |

[1] J. Silva, et al., "From symbolic to sub-symbolic information in question classification," *Artificial Intelligence Review*, vol. 35, no. 2, pp. 137-154, 2011.
[2] N. Kalchbrenner, et al., "A convolutional neural network for modelling sentences," *Proceedings of the 52nd Annual Meeting of the Association for Computational Linguistics*, 2014.
[3] M. Ma, et al., "Dependency-based convolutional neural networks for sentence embedding," *Proceedings of the 53rd Annual Meeting of the Association for Computational Linguistics*, 2015.
[4] Y. Shi, et al., "Deep LSTM based feature mapping for query classification," in *Proceedings of the 2016 Conference of the North American Chapter of the Association for Computational Linguistics: Human Language Technologies*, 2016, pp. 1501-1511.

3. Some parameter Analysis

Figure 8A:
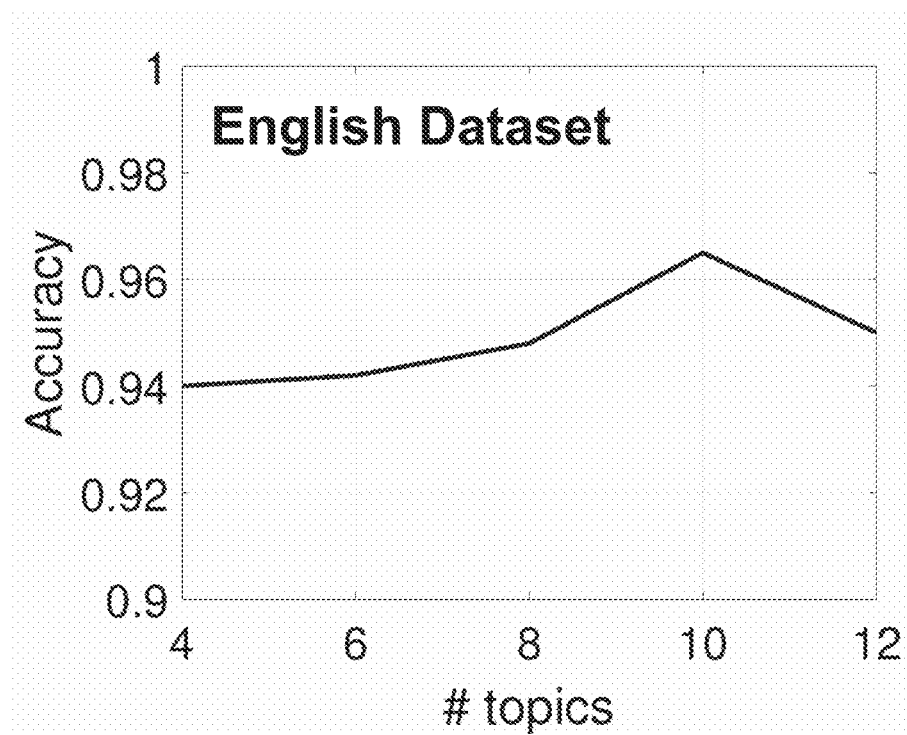
FIG. 8A depicts performance of TWEE framework embodiments with different topic numbers for an English dataset, according to embodiments of the present disclosure.
Figure 8B:
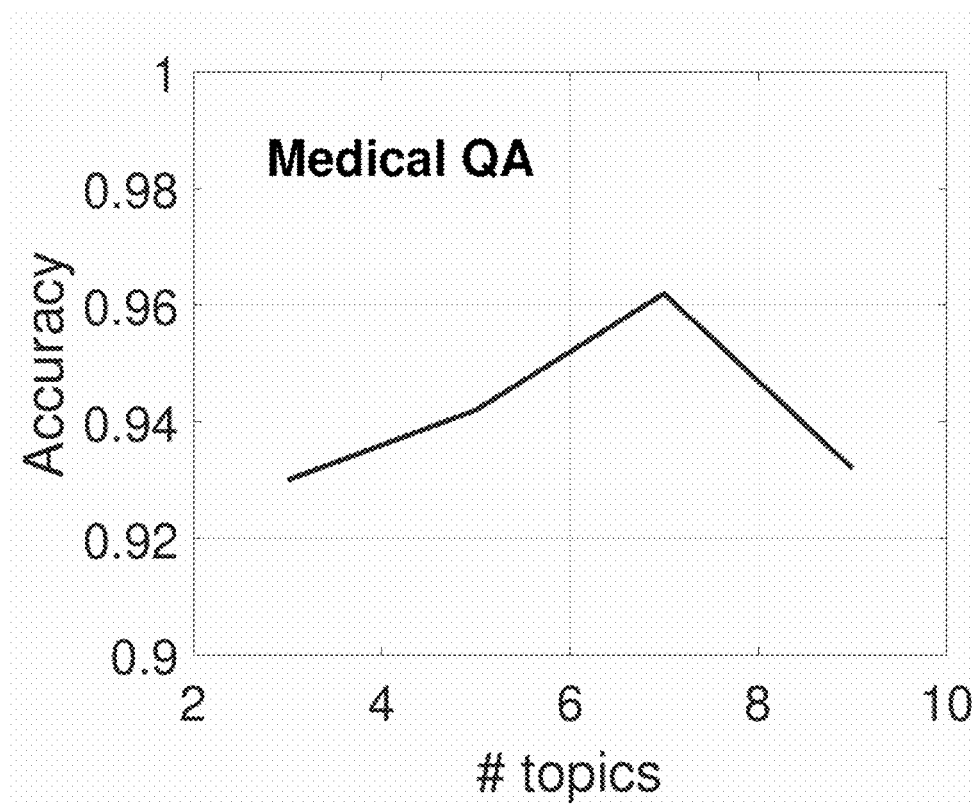
FIG. 8B depicts performance TWEE framework embodiments with different topic numbers for a Chinese medical QA dataset, according to embodiments of the present disclosure.

In one or more experiments, a study was provided on how the number of topics influence the performance of the proposed TWEE framework. Intuitively speaking, questions belonging to the same category focus on a certain topic. Therefore, the number of topics should be larger than or equal to the number of classes. FIG. 8A and FIG. 8B respectively show the classification accuracy of TWEE embodiments on the English and the Chinese medical QA datasets. For both the English dataset and the Chinese Medical QA dataset, best performances came from some topic numbers which are higher than the number of classes. This showed some correlations between the class numbers and the topic numbers For the English dataset, results with topic numbers of 4, 6, 8, 10 and 12 were analyzed. The best performance was achieved when the topic number is 10. Since the number of classes was 6 for the English dataset, 10 topics may help distinguish the semantic information from different classes. On the other hand, the performance of TWEE dropped when the topic number was larger than 10, which in part reflects the fact that questions are usually short texts. The longest sentence in the English dataset has only 37 words. More topics cannot help TWEE learn discriminative embeddings from short sentences. Therefore, in the experiment, the number of topics was set as 10 for the English dataset.

For the Chinese medical QA dataset, the number of topics was selected from 3, 5, 7 and 9. FIG. 8B depicts the accuracy of TWEE showing that the performance is best when the number of topics is 7, which is larger than the number of classes (3) in the medical QA dataset. Thus in the experiment, the number of topics was set at 7.

F. Some Conclusions

In this patent document, embodiments of a unified neural network framework are disclosed for the task of question classification by integrating topic modeling, word embedding and entity embedding into the unified neural network framework. The work is inspired by: (1) Topic modeling often captures meaningful semantic structures from the question corpus. Such global topical information are helpful for question representations; (2) Entities extracted from question themselves provide more auxiliary information for short texts from a local viewpoint. In TWEE, embodiments of a novel topic sparse autoencoder are introduced to incorporate discriminative topics into the representation learning of questions. A sparsity constraint is added to ensure the most discriminative representations are related to question topics. In addition, both words and entities are embedded into the network to help learn a comprehensive question representation. Extensive empirical experiments on two datasets clearly demonstrate that TWEE outperforms the state-of-the-art methods.

G. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
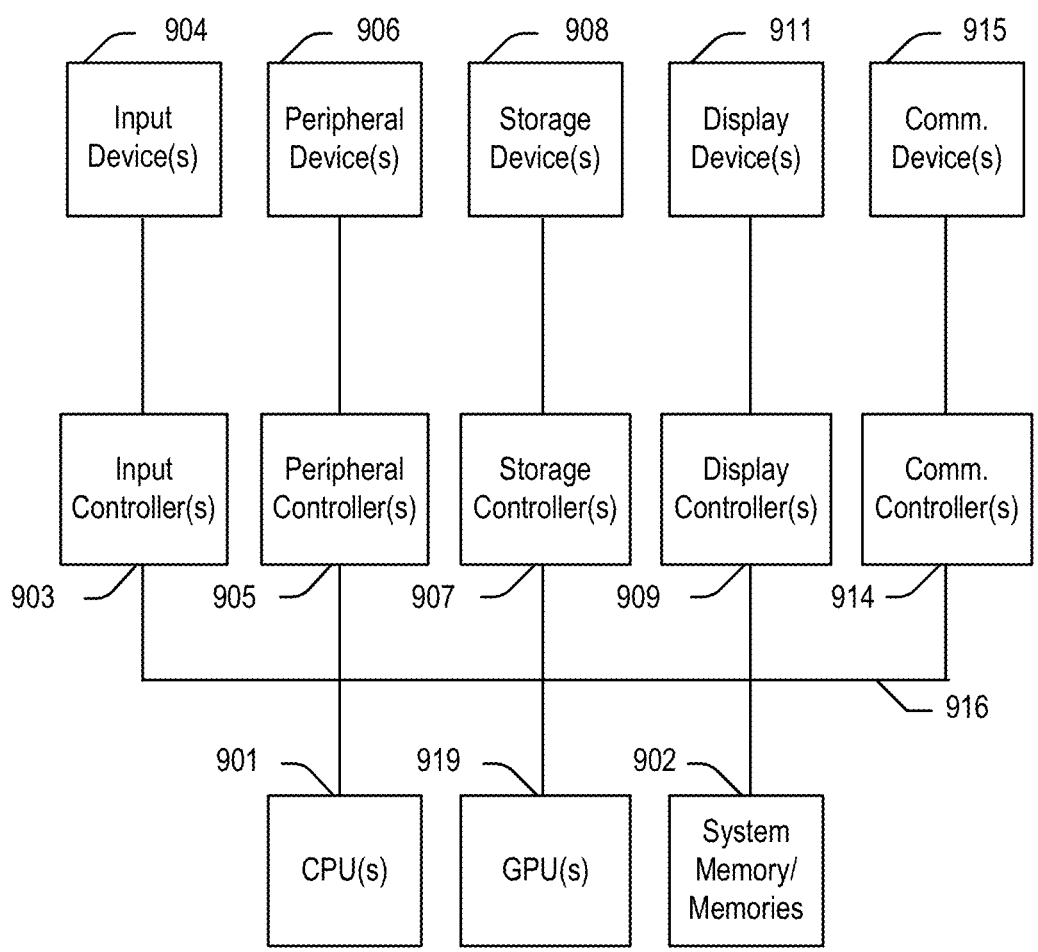
FIG. 9 depicts a simplified block diagram of a computing device/information handling system, in accordance with embodiments of the present document.

FIG. 9 depicts a simplified block diagram of a computing device/information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for classifying an input comprising a set of words, the method comprising:
feeding the input into a topic modeling, word embedding, and entity embedding (TWEE) model;
obtaining a topic embedding of the input that reflects a distribution of topics in the input;
obtaining a word embedding of the input that considers local context information of the input;
obtaining an entity embedding corresponding to one or more entities in the input;
concatenating at least the topic embedding and the word embedding to obtain a concatenated representation; and
processing the concatenated representation through one or more neural network layers to obtain a classification of the input by performing steps comprising:
feeding the concatenated representation into a convolutional layer comprising multiple filters to detect features at different positions;
applying a max-pooling on representations obtained from the detected features to select a set of features;
employing a neural network (NN) layer for sequential processing of the set of features;
feeding a hidden state output at the last time step of the (NN) layer into a fully connected layer; and
applying a prediction layer to an output obtained from the fully connected layer to obtain the classification of the input.

2. The computer-implemented method of claim 1 wherein obtaining a topic embedding of the input is performed using a topic sparse autoencoder (TSAE) that performs steps comprising:
generating a topic distribution over the input among one or more topics by topic modeling;
obtaining a topic distribution for words based on the topic distribution over the input;
encoding, via an encoder, the input into a hidden representation comprising one or more word embeddings;
using the topic distribution for words to form a topic distribution over hidden state; and
including the topic distribution over hidden state in an overall cost function of the TSAE to update encoder parameters and obtain the topic embedding of the input.

3. The computer-implemented method of claim 2 wherein the topic modeling comprises a pre-trained probabilistic topic model.

4. The computer-implemented method of claim 2 wherein the overall cost function of TSAE comprises a topic guidance term based on a sum of Kullback-Leibler (KL) divergences divergence between a topic sparsity parameter for the hidden representations and an average activation of a hidden layer for each topic.

5. The computer-implemented method of claim 1 wherein the concatenated representation is obtained by concatenating the topic embedding, the word embedding, and the entity embedding into the concatenated representation.

6. The computer-implemented method of claim 1 wherein the input is a question and the classification identifies a question type for the input.

7. The computer-implemented method of claim 1 wherein the neural network layer comprises a long short-term memory (LSTM) layer.

8. The computer-implemented method of claim 2 wherein the TSAE is an unsupervised feedforward neural network trained by applying backpropagation by fitting the input using a decoded representation for the input, the overall cost function of the TSAE comprises a term for an average of reconstruction loss.

9. The computer-implemented method of claim 1 wherein a cross entropy loss is calculated for input classification and backpropagations are made to train the TWEE model.

10. A computer-implemented method for classifying an input comprising a set of words, the method comprising:
obtaining, at a topic sparse autoencoder (TSAE), a topic embedding of the input using steps comprising:

generating a topic distribution over the input among one or more topics by topic modeling;

obtaining a topic distribution for words based on the topic distribution over the input;

encoding, via an encoder, the input into a hidden representation comprising one or more word embeddings;

using the topic distribution for words to form a topic distribution over hidden state; and including the topic distribution over hidden state in an overall cost function of the TSAE to update encoder parameters and obtain the topic embedding of the input;

obtaining a word embedding of the input that considers local context information of the input; and obtaining a classification of the input based on at least the topic embedding and the word embedding by performing steps comprising:

concatenating at least the topic embedding and the word embedding to form a concatenated representation;

feeding the concatenated representation into a convolutional layer to detect features;

selecting a set of features from the detected features;

employing a neural network layer for sequential processing of the set of features;

feeding a hidden state output at the last time step of the neural network layer into a fully connected layer; and applying a prediction layer to an output obtained from the fully connected layer to obtain the classification of the input.

11. The computer-implemented method of claim 10 wherein the TSAE is an unsupervised feedforward neural network trained by applying backpropagation by fitting the input using a decoded representation for the input, the overall cost function of the TSAE comprises a term for an average of reconstruction loss.

12. The computer-implemented method of claim 10 wherein the overall cost function of TSAE further comprises a topic guidance term based on a sum of Kullback-Leibler (KL) divergences between a topic sparsity parameter for the hidden representations and an average activation of a hidden layer for each topic.

13. The computer-implemented method of claim 10 wherein the input is a question and the classification identifies a question type for the input.

14. The computer-implemented method of claim 10 wherein the neural network layer comprises a long short-term memory (LSTM) layer.

15. The computer-implemented method of claim 10 wherein the word embedding of the input is obtained using a skip-gram model using stochastic gradient descent with negative sampling.

16. A non-transitory computer-readable medium or media comprising one or more sequences of instructions which, when executed by one or more processors, causes the steps for classifying an input comprising a set of words to be performed comprising:

obtaining, using a topic sparse autoencoder, a topic embedding of the input that reflects a distribution of topics in the input;

obtaining a word embedding of the input that considers local context information of the input;

obtaining an entity embedding corresponding to one or more entities in the input;

concatenating the topic embedding, the word embedding, and the entity embedding into a mixture embedding; and processing, through a classifier comprising one or more neural network layers, the mixture embedding to obtain a classification of the input by performing steps comprising:

feeding the concatenated representation into a convolutional layer comprising multiple filters to detect features at different positions;

applying a max-pooling on representations obtained from the detected features to select a set of features;

employing a neural network layer for processing of the set of features;

feeding a hidden state output at the last time step of the neural network layer into a fully connected layer; and applying a prediction layer to an output obtained from the fully connected layer to obtain the classification of the input.

17. The non-transitory computer-readable medium or media of claim 16 wherein obtaining a topic embedding of the input comprises:

generating a topic distribution over the input among one or more topics by topic modeling;

obtaining a topic distribution for words based on the topic distribution over the input;

encoding, via an encoder, the input into a hidden representation comprising one or more word embeddings;

using the topic distribution for words to form a topic distribution over hidden state; and including the topic distribution over hidden state in an overall cost function of the TSAE to update encoder parameters and obtain the topic embedding of the input.

18. The non-transitory computer-readable medium or media of claim 17 wherein the overall cost function comprises a term for reconstruction loss related to the difference between a representation of the input and a decoded representation which is decoded from the hidden representation.

19. The non-transitory computer-readable medium or media of claim 17 wherein the overall cost function comprises a topic guidance term based on a sum of Kullback-Leibler (KL) divergences between a topic sparsity parameter for the hidden representations and an average activation of a hidden layer for each topic.

20. The non-transitory computer-readable medium or media of claim 16 wherein the input is a question and the classification identifies a question type for the input.

* * * * *